United States Patent [19]

Nommensen

[11] 4,285,367

[45] Aug. 25, 1981

[54] DEVICE FOR MIXING TWO FLUIDS

[75] Inventor: Johan P. Nommensen, Stein, Netherlands

[73] Assignee: Stamicarbon, B.V., Geleen, Netherlands

[21] Appl. No.: 127,986

[22] Filed: Mar. 4, 1980

[30] Foreign Application Priority Data

Mar. 6, 1979 [NL] Netherlands ........................ 7901750

[51] Int. Cl.³ ............................................. F16K 19/00

[52] U.S. Cl. .................................... 137/888; 137/896; 366/160; 366/174

[58] Field of Search ........................ 137/604, 888, 896; 366/160, 167, 174

[56] References Cited

U.S. PATENT DOCUMENTS

| | | | |
|---|---|---|---|
| 759,603 | 5/1904 | Foster | 137/604 X |
| 1,102,505 | 7/1914 | Henderson | 137/604 UX |
| 3,540,474 | 11/1970 | Sharples | 137/604 X |
| 3,646,607 | 2/1972 | Dower | 137/604 |

*Primary Examiner*—Robert G. Nilson

*Attorney, Agent, or Firm*—Cushman, Darby & Cushman

[57] ABSTRACT

A unique and novel mixing device to effect an intense and rapid mixing of two fluids which is comprised of a venturi tube connected to the first fluid and a feed member disposed around the venturi tube through which the second fluid can flow. The feed member has one or more chambers which connect with the venturi tube through which the second fluid can be admixed with the first fluid. A baffle is positioned axially opposite the exit of the venturi tube to promote additional mixing.

14 Claims, 5 Drawing Figures

DEVICE FOR MIXING TWO FLUIDS

The present invention is directed to a unique and novel device for mixing two fluids. The device is comprised of a venturi tube through which a first fluid can flow with a feed member disposed around the venturi tube through which a second fluid can flow.

The venturi tube, looking in the direction of the flow of the first liquid, narrows to a throat and then widens. The feed member which is disposed around the venturi tube has one or more channels which connect to the venturi tube through which the second fluid is admixed with the first fluid. A baffle is positioned axially opposite the exit of the venturi tube to promote additional mixing.

The term fluid as used herein will be in the first instance be understood to mean liquids, but the device of the present invention can be used to admix both liquids and gases.

BACKGROUND OF THE INVENTION

A device of this general nature is disclosed in Swiss Patent No. 487,670. That device is designed so that the flow of liquid will be as smooth as possible. This is accomplished by providing the baffle with a conical guide whose apex extends into the venturi tube. As a result of this baffle design, the second, admixed, liquid tends to move along the wall of the venturi tube as a film. This in turn causes problems in some application in that the rate of mixing will be slow. In certain applications, especially where the device is used for mixing and for reacting two liquids which have a high reaction rate, if the rate of mixing is too slow undesirable side reactions will occur.

The mixed liquid is then passed to a discharge point along the external wall of the mixer as a continuous flow. Therefore, such a mixer can be used to provide additional mixing capabilities in a line with a continuous liquid flow.

OBJECT OF THE INVENTION

The object of the present invention is to provide a mixing device similar to that described in the Swiss Patent No. 487,670, but which instead will provide rapid mixing of the liquid.

DESCRIPTION OF THE INVENTION

The mixing device of the present invention is comprised of five major elements. First, there is a venturi tube connecting to the feed line for the first liquid. The length of the first part of the tube, i.e., the distance from the inlet to the narrow throat of the tube, is in the range of about 40% to about 160% of the throat diameter. Similarly, the length of the second part of the venturi tube, i.e., the distance from the throat to the exit of the venturi tube, is in the range of about 20% to about 70% of the throat diameter.

The second major element of the mixing device of the present invention is a feed member disposed around the venturi tube with a channel or channels for adding the second liquid from the feed member disposed around the venturi tube. These channels open into the second part of the venturi tube.

The third element of the mixing device is a turbulence chamber which is connected with an abrupt widening to the outlet of the venturi tube.

The fourth element is a secondary mixing chamber into which the turbulence chamber opens, and from which the mixed liquid issues at the circumference.

The fifth and final major element of the present invention is a baffle which is in the shape of an axially positioned concave dish with its concave side facing the venturi tube. The concave side of the baffle forms the bottom of the secondary mixing chamber.

Preferably, the present mixing device will have the following dimensions which are based on the diameter of the throat of the venturi tube, hereinafter D. The length of the first part of the venturi tube, i.e., from the inlet to the throat, is in the range of about 0.4 D to about 1.0 D. The length of the second part of the venturi tube, i.e., from the throat to the outlet of the tube, is in the range of about 0.2 D to about 0.5 D. The length of the turbulence chamber is at most about 1.5 D. The diameter of the concavity of the concave dish is in the range of about 0.6 D to about 3.0 D. The length of the secondary mixing chamber to the bottom of the concave dish is in the range of about 0.2 D to about 2.0 D.

The angle included between the internal profile of the section of the turbulence chamber and the venturi tube at the point where the turbulence chamber meets the venturi tube is between about 90° and about 135°.

Preferably, the turbulence chamber is comprised of three sections. The first of which is connected directly to the venturi tube and has a concave inner profile. The second part is cylindrical and is connected to the first and third parts. The third section widens conically and is connected to the second part.

Preferably, the mixing device is dimensioned so that the tangent, to the profile of the concavity of the dish at the point the concavity of the dish has its longest diameter, intersects the profile of the conically widening third part of the turbulence chamber, or the extension of that profile, at an angle that differs from 90° by not more than 20°. The diameter of the cylindrical second part of the turbulence chamber is, preferably, in the range of about 1.5 D to about 3.0 D.

The internal profile of the venturi tube will, preferably, have a flowing convex shape, as this shape will keep the pressure loss in the venturi tube to a minimum. However, a venturi tube with different internal profiles, for example, a tube composed of two conical parts, is still within the scope of the present invention.

A mixing device of the design of the present invention while being relatively simple effects an extraordinarily intensive and rapid mixing. There are, in fact, three different mixing stages with mixing first occurring in the venturi tube, then a subsequent mixing in the turbulence chamber, followed by still a third mixing operation in the secondary mixing chamber.

In operation, the mixing device of the present invention effects its intense and rapid mixing as follows: Any film of the second liquid which may have formed on the wall of the relatively short second part of the venturi tube is torn loose from the wall at the abrupt shape transition from the venturi tube to the turbulence chamber. The violent turbulence occurring at that location promotes rapid and intensive mixing of the two fluids. The outer portion of the liquid jet entering the secondary mixing chamber from the turbulence chamber is approximately conical in shape and is hit at an angle of about 90° by a second approximately conical jet of liquid whose apex angle coincides approximately with the concave dish against which the central portion of the liquid jet coming from the turbulence chamber impinges.

Thus, a very simple device achieves remarkably rapid and intense mixing. Mixing devices of the present design are usually positioned in, and substantially coaxial with, a collecting vessel with a substantially rotational symmetrical shape. Preferably, the circumference of the secondary mixing chamber will be provided with a ring of vanes which impart a rotary motion to the liquid exiting into the collecting vessel. The collecting vessel may be substantially cylindrical and is preferably provided with at least one correspondingly tangential discharge. Thus, part of the energy of motion present in the liquid is utilized.

However, collecting vessels which are not cylindrical in shape may also be used in conjunction with mixing devices of the present invention. For example, the collecting vessel may be, in part, conical, and would then act as a hydrocyclone in the event the reaction taking place during mixing resulted in the formation of solids. The largest internal diameter of the rotationally symmetric collecting vessel is preferably between about 5.0 D and about 100 D.

DRAWINGS

The invention is elucidated by reference to the following drawings.

Same parts have same reference numbers in all figures. The reference numbers indicate.

Figure 2:
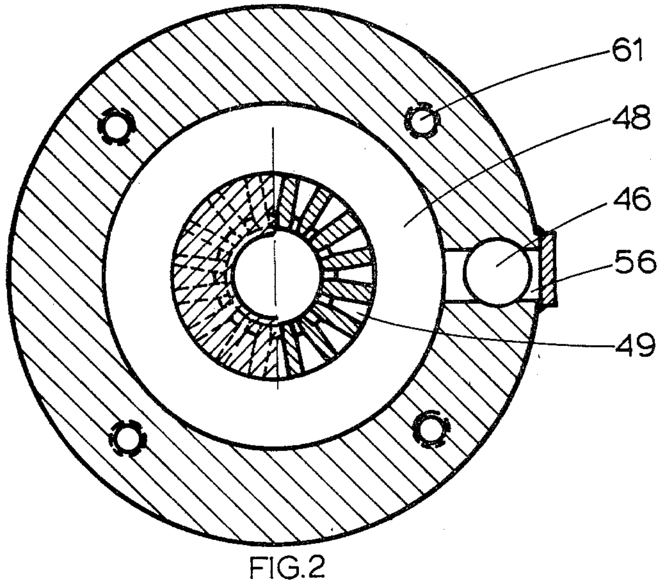
FIG. 2 is a horizontal section along the line II—II in FIG. 1, the left-hand half showing a section in the plane of the throat of the venturi tube, and the right-hand half a section in the plane passing through the centers of the feed channels for the second liquid.

41: a cylindrical housing of corrosion-proof material (chrome-nickel steel);
42: an insert fixed in the housing 1, made of corrosion-proof and wear-resistant material (chrome-nickel-molybdenum steel);
43: a feed line for a first liquid;
44: a feed line for a second liquid;
45: a central bore in the housing 41 connecting to the line 43;
46: an eccentric bore in the housing 41 connecting to the line 44;
47: an opening in insert 42 having the shape of a venturi tube which, in a first part of length a, narrows to a throat 471 of diameter D, and, in a, shorter, second part of the length b, widens again, with length a being between about 0.4 D and about 1.6 D and length b being between about 0.2 D and about 0.7 D;
48: an annular feed chamber around the venturi tube, disposed in the periphery of insert 42;
49: channels opening from annular chamber 48 into the second, widening, part of the venturi tube;
50: a turbulence chamber in insert 42, connecting to venturi tube 47 and terminating at 501, whose length c is not more than about 1.5 D;

51: the first part of turbulence chamber 50, with a concave internal profile;
52: the second part of turbulence chamber 50, which is cylindrical and whose diameter e is about 1.5 to about 3 D;
53: the third part of turbulence chamber 50, which has a conically widening shape;
54: a concave dish placed axially opposite venturi tube 47, which dish is made of corrosion-proof and wear-resistant material (chrome-nickel-molybdenum steel), and the diameter g of the concavity of which is between about 0.6 D and about 3.0 D; the dish has an integral stud bolt 541;
55: the space between the mouth 501 of turbulence chamber 50 and the dish 54; this space forms a secondary mixing chamber, whose length h is between about 0.2 D and about 2 D;
56: a transverse bore in the housing 41; this bore connects the eccentric longitudinal bore 46 with annular chamber 48;
57: guide vanes which impart a rotary motion to the mixed liquid leaving the secondary mixing chamber 55 laterally;
58: a ring on which the vanes 57 are fastened (welded, for instance);
59: a cross of rectangular strips fastened (welded, e.g.) in the ring (58), in the center of which cross the dish 54 is fixed;
60: a nut screwed onto stud bolt 541, by means of which the dish 54 is fastened;
61: bolts fastening the ring 58 with the vanes 57 to the housing 1;
62: bolts by means of which the insert 2 is fastened in the housing 1;
63, 64, 65: sealing rings;
71: a mixing device as illustrated in FIGS. 1-4;
72: a cylindrical collecting vessel in which mixing device 71 is mounted coaxially;
73: a discharge duct connected tangentially to collecting vessel 72.

Figure 1:
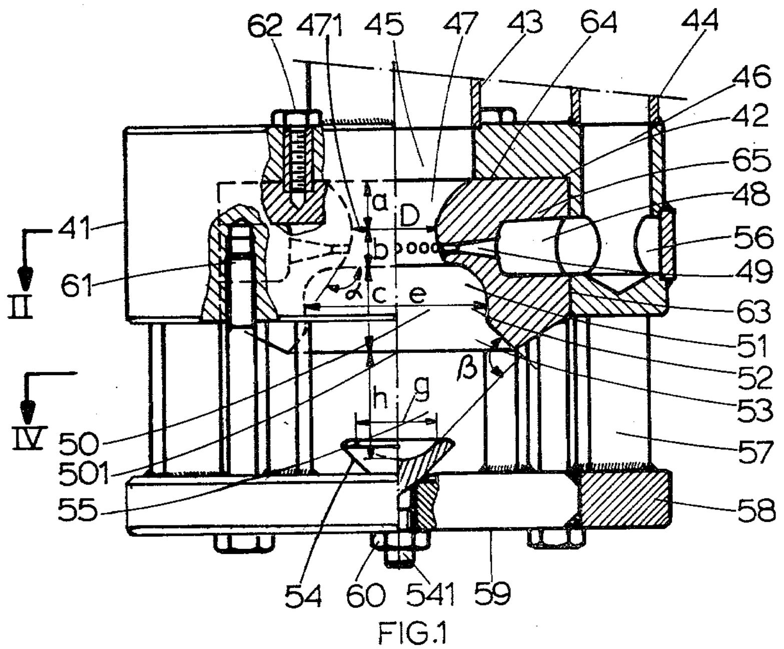
FIG. 1 is a view, partly in elevation, partly in axial section, of a mixing device according to the invention, along the line I—I in FIG. 2.
Figure 3:
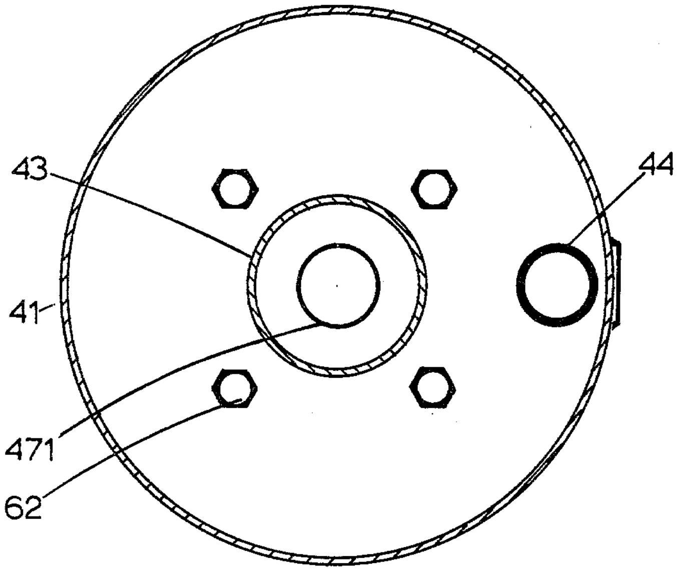
FIG. 3 is a top view of the mixing device.
Figure 4:
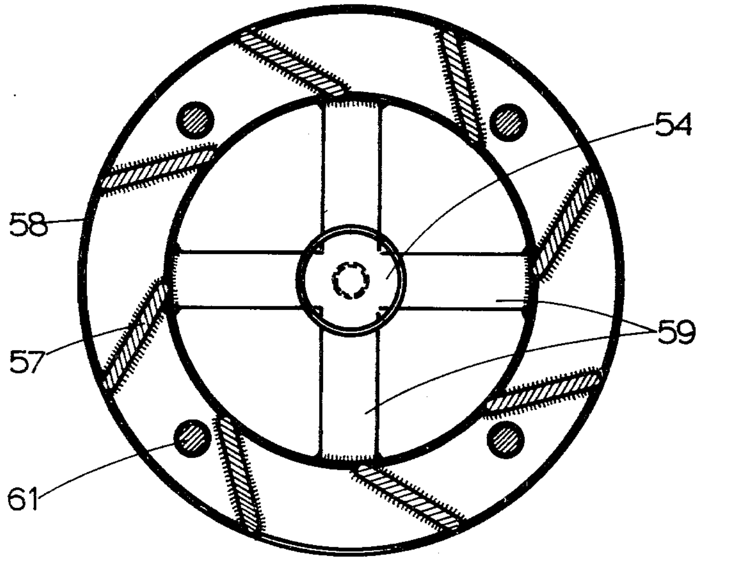
FIG. 4 is a horizontal section along line IV—IV in FIG. 1.
Figure 5:
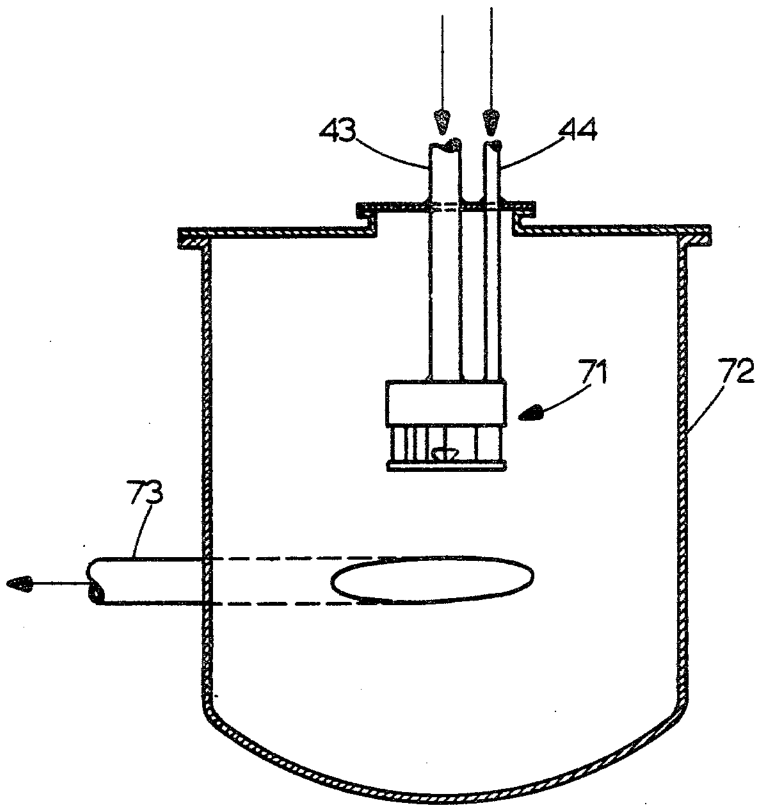
FIG. 5 is a view, partly in axial section, of a mixing device according to the present invention placed in and substantially coaxial with a collecting vessel.

In FIG. 1, $\alpha$ denotes the angle included between the internal profile of the section of venturi tube 47 and that of the connecting part of turbulence chamber 50; this angle $\alpha$ is, in the present example, about 120°.

Further, $\beta$ denotes the angle included between the tangent to the profile of the concavity of dish 54, at the point where this has its largest diameter, and the extension of the profile of the concically widening part 53 of turbulence chamber 50; this angle $\beta$ here is about 90°,

EXAMPLE

To test the uniformity of mixing, a mixing device according to the present invention, as shown in the drawing, was used to mix water with a nearly saturated solution of potassium permanganate. The essential dimensions of the mixer, as indicated in the drawing, were:

D: 31.5 mm
a: 19 mm
b: 12 mm
c: 31 mm
e: 65 mm
g: 31 mm
h: 38 mm

The mixer was placed in a collecting vessel having a diameter of 1100 mm.

Through line 43, water was supplied at the rate of 60 $m^3$ an hour and through line 44 a nearly saturated solution of potassium permanganate was supplied at the rate of 1.8 $m^3$ per hour. Under these conditions, the residence time of the liquid in the mixer is about 0.01 second.

At a number of points between the vanes 57, distributed over the circumference of the mixer and on different levels, simultaneous sampling was effected repeatedly by means of sampling probes. Colorimetric examination showed that there was no demonstrable difference outside the measuring error between individual samples, which means that the mixing device according to the present invention effects virtually ideal mixing within the very short time of about 0.01 second.

What is claimed is:

1. Device for mixing two fluids provided with a venturi tube through which a first fluid can flow said venturi tube in the direction flow narrowing in a first part to a throat and then widening in a shorter second part, with a feed member for a second fluid disposed around said venturi tube and from said feed member one or more channels open into said venturi tube, through which said channels said second fluid can be added to said first fluid, and with a baffle placed axially opposite the mouth of said second part of said venturi tube, comprising,

- a venturi tube connecting to a feed line for said first fluid with the length of said first part of said venturi tube from the inlet to said throat of said tube in the range of from about 0.4 D to about 1.6 D, wherein D is the diameter of said throat of said venturi tube, and the length of said shorter second part of said venturi tube from said throat to the outlet of said tube in the range of from about 0.2 D to about 0.7 D, wherein D is the diameter of said throat,
- channels for adding said second fluid from said feed member disposed around the venturi tube, said channels opening into said second part of said venturi tube,
- a turbulence chamber which connects with an abrupt widening to said outlet of said venturi tube,
- a secondary mixing chamber into which said turbulence chamber opens and from which said mixed fluid can issue at the circumference, and
- a baffle in the shape of an axially positioned concave dish having its concave side facing said venturi tube, said baffle forming the bottom of said secondary mixing chamber.

2. The device of claim 1, wherein the length of said first part of said venturi tube, from said inlet to said throat, is in the range of about 0.4 D to about 1.0 D.

3. The device of claim 1, wherein the length of said second part of said venturi tube, from said throat to said outlet, is in the range of about 0.2 D to about 0.5 D.

4. The device of claim 1, wherein the length of the turbulence chamber is at most about 1.5 D.

5. The device of claim 1, wherein the diameter of the concavity of the concave dish is in the range of from about 0.6 D to about 3.0 D.

6. The device of claim 1, wherein the length of said secondary mixing shamber measured to the bottom of the concave dish is in the range of from about 0.2 D to about 2.0 D.

7. The device of claim 1, wherein the angle included between the internal profile of the turbulence chamber and that of the venturi tube at the place where said turbulence chamber meets said venturi tube is in the range of from about 90° to about 135°.

8. The device of claim 1, wherein said turbulence chamber is comprised of a first part which connects directly to said venturi tube and which has a concave internal profile, a cylindrical second part connecting to said first part, and a conically widening third part connecting to said secon part.

9. The device of claim 8, wherein the tangent to the internal profile of the section of the concavity of the dish at the point where of its largest diameter, intersects the internal profile of the conically widening third part of the turbulent chamber, or the extension of this internal profile, at an angle that differs from 90° by not more than about 20°.

10. The device of claim 8, wherein the diameter of said cylindrical second part is in the range of from about 1.5 D to 3.0 D.

11. The device of claim 1, wherein the internal profile of said venturi tube has a smooth convex shape.

12. The device of claim 1, placed in and substantially coaxial with a collecting vessel with a substantially rotational symmetrical shape, wherein the circumference of said secondary mixing chamber is provided with a ring of vanes to impart a rotary motion to the fluid issuing into said collecting vessel.

13. The device of claim 12, wherein said collecting vessel is substantially cylindrical in shape.

14. The device of claim 12, wherein the largest internal diameter of the collecting vessel is in the range of from about 5 D to 100 D.

* * * * *